United States Patent [19]

Kennar

[11] 4,035,549
[45] July 12, 1977

[54] INTERLAYER FOR LAMINATED SAFETY GLASS

[75] Inventor: George A. Kennar, East Longmeadow, Mass.

[73] Assignee: Monsanto Company, St. Louis, Mo.

[21] Appl. No.: 578,710

[22] Filed: May 19, 1975

[51] Int. Cl.$^2$ .............. B32B 27/40; B22D 11/126
[52] U.S. Cl. ..................... 428/409; 428/437; 428/424; 428/426; 260/73 L; 260/77.5 AP; 260/75 TN
[58] Field of Search ......... 428/409, 437, 426, 424; 260/73 L, 77.5 AP, 75 TN

[56] References Cited

U.S. PATENT DOCUMENTS

| | | | |
|---|---|---|---|
| 2,765,682 | 10/1956 | Wiley | 76/107 |
| 3,177,558 | 4/1965 | Gronholz | 29/121 |
| 3,234,062 | 2/1966 | Morris | 428/437 |
| 3,235,426 | 2/1966 | Bruner | 428/409 |
| 3,282,722 | 11/1966 | Hailstone | 428/409 |
| 3,300,286 | 1/1967 | Nalband | 29/183.5 |
| 3,561,995 | 2/1971 | Wu | 428/409 |
| 3,591,406 | 7/1971 | Moynihan | 428/409 |
| 3,752,731 | 8/1973 | Stiegler | 428/409 |
| 3,823,060 | 7/1974 | McClung | 428/424 |
| 3,841,955 | 10/1974 | Coaker | 428/437 |
| 3,922,456 | 11/1975 | Baldridge | 428/437 |

FOREIGN PATENT DOCUMENTS 717,387  8/1951  United Kingdom

*Primary Examiner*—Ellis Robinson
*Attorney, Agent, or Firm*—W. J. Farrington; J. C. Logomasini; S. M. Tarter

[57] ABSTRACT

Disclosed herein is an improved interlayer for laminated safety glass. The improved interlayer is characterized by having at least one surface which is more printable without sacrificing the surface roughness required to prevent blocking of the sheet and to facilitate de-airing of laminates prepared from the interlayer.

9 Claims, 2 Drawing Figures

INTERLAYER FOR LAMINATED SAFETY GLASS

BACKGROUND OF THE INVENTION

1. Field of the Invention

The present invention relates to an improved interlayer used in the manufacture of laminated safety glass. More particularly, the invention relates to an interlayer having an improved sheet surface.

2. Description of the Prior Art

Laminated safety glass is well known in the art for use as glazing units for vehicles, especially automobile windshields, and for architectural uses. Laminated safety glass comprises at least one sheet of glass laminated to at least one sheet of a synthetic resin material which is usually referred to as the interlayer. The laminate may be the sandwich type construction wherein the interlayer is interposed between two pieces of glass. Alternately, the laminate may comprise a single sheet of glass laminated to a synthetic resin sheet (also referred to as an interlayer for the purposes of the present invention). In the latter type of laminated safety glass the surface of the synthetic resin sheet, which is not laminated to the glass, may optionally be coated with or laminated to another synthetic polymeric material.

Interlayers are conventionally prepared with rough surfaces, which may be the same or different for both sides of the sheet. The rough surfaces of the sheet are defined herein in terms of peaks and valleys occurring around a roughness mean centerline (hereinafter defined). The rough surfaces are required in order to prevent blocking, i.e., the tendency of the interlayer to stick to itself. Rough surfaces are also required to prevent premature adhesion of the interlayer to the other component of the laminate, usually glass, and to facilitate de-airing of the laminate assembly during the lamination procedure.

Although the surface roughness helps to prevent blocking and facilitates de-airing, it causes problems in the printing of the surface of the sheet. The rougher the sheet the harder it is to obtain an acceptable printed gradient on the sheet. The deeper valleys in the sheet are especially troublesome in that they give rise to significant printing defects. Consequently, seasoning of the sheet, i.e., heating of the sheet at elevated temperatures for prolonged periods of time is required in order to obtain a uniform gradient.

Thus, a need exists in the art for interlayer materials for laminated safety glass having an improved sheet surface which provide a better printing surface while still maintaining the desired level of roughness to minimize blocking and to facilitate de-airing.

SUMMARY OF THE PRESENT INVENTION

The present invention fulfills the above mentioned need in the art by providing an interlayer for laminated safety glass wherein at least one surface of the interlayer is characterized by having:

A. an arithmetic average roughness in the range of from 12 to $18 \times 10^{-5}$ inches (3.1 to 4.6 microns) as calculated around a roughness mean centerline drawn through the peaks and valleys on the surface of the interlayer;

B. a roughness height in the range of from $48 \times 10^{-5}$ to $72 \times 10^{-5}$ inches (12.2 to 18.3 microns) wherein at a distance of 0.4 mil (10.2 microns) or less from the mean centerline going in the direction to the center of the interlayer there are substantially no valleys on the surface of the interlayer.

$$AA = \frac{H_1 + H_2 + H_3 \cdots H_n}{n} \quad \text{(Formula I)}$$

Line C-D represents the Roughness Height which is four times the Arithmetic Average which may be expressed by the following formula:

$$RH = 4\,AA \quad \text{(Formula II)}$$

The lines E-F and E'-F', which are equidistant above and below the RMCL, define a null band around the RMCL. In the interlayers of the present invention when the line E'-F' is placed 0.4 mil (10.2 microns) below the RMCL, i.e., going towards the center of the sheet, there will be substantially no valleys below the line E'-F'. Stated in another way, when the line E'-F' is 0.4 mil (10.2 microns) below the RMCL the area of the valleys below the line E'-F' is substantially zero. On the other hand, when the line E-F is 0.4 mil (10.2 microns) above the RMCL, there will still be a substantial number of peaks above it on the surface of the sheet. It should be noted here that these peaks are functional in that they provide the surface roughness which minimizes blocking and facilitates de-airing. On the other hand, the deep valleys are not functional and may give rise to printing defects.

Figure 1:
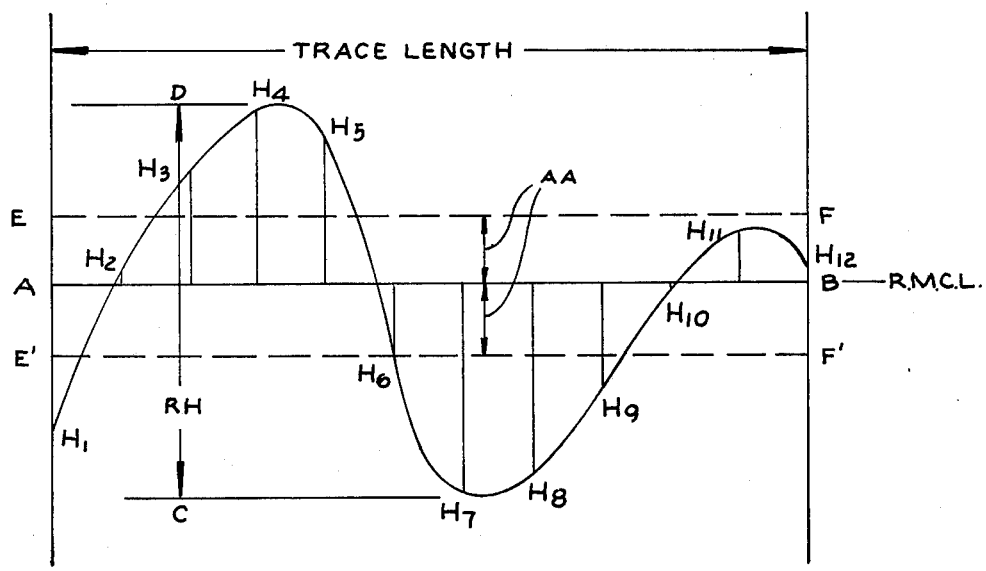
FIG. 1 illustrates a cross section (not to scale) showing the surface of an interlayer for laminated safety glass. The line A-B is the roughness mean centerline (RMCL). The RMCL is drawn so that the area of the peaks above the line is equal to the area of the valleys below the line. The distance of equi-spaced points $H_1$ to $H_{12}$ on the surface from the RMCL are determined and these measurements are used to obtain the Arithmetic Average roughness (AA). The Arithmetic Average roughness is determined by adding the distances of each point from the mean centerline and then dividing the sum of these distances by the total number of points according to the following formula.
Figure 2:
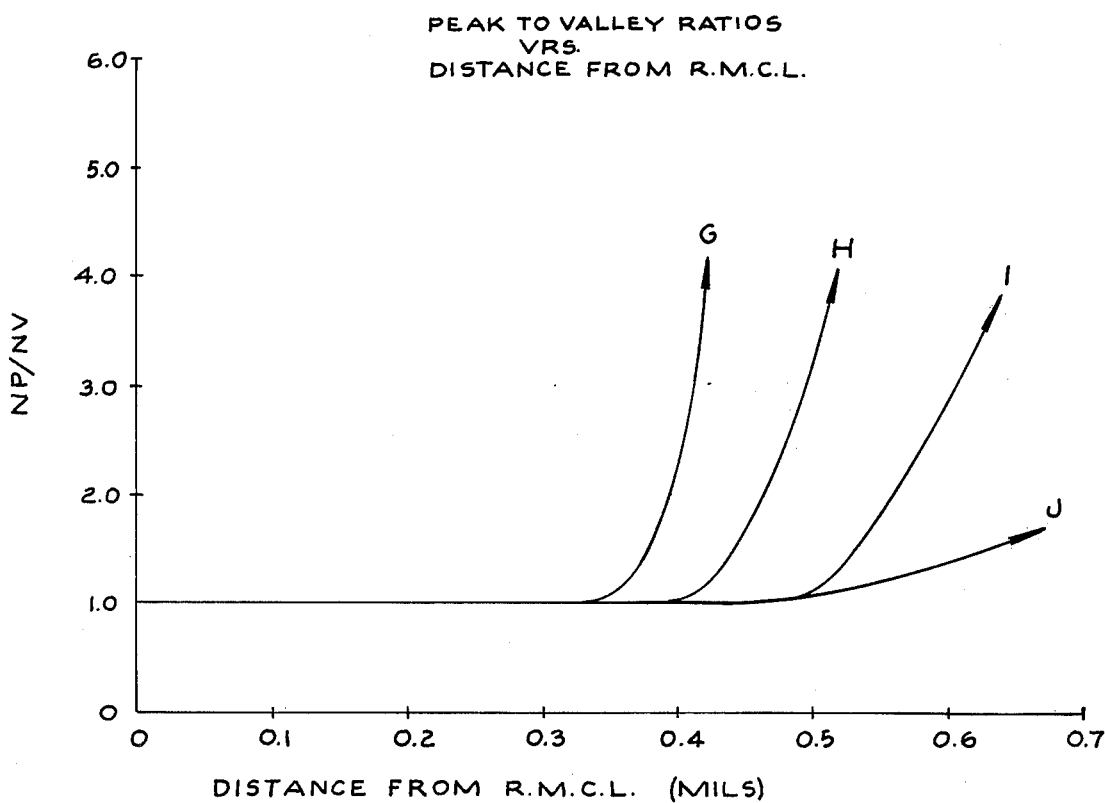

FIG. 2 is a plot of the ratio of the number of peaks (NP) to the number of valleys (NV) at various points equidistant above and below the roughness mean centerline (RMCL). The distances were taken along the lines E-F and E'-F' illustrated in FIG. 1 at points from 0.1 to 0.7 mil (2.5 to 18 microns) above and below the RMCL. Curve G was made on plasticized polyvinyl butyral interlayers according to the present invention. Curves H, I and J were made from conventional plasticized polyvinyl butyral interlayers of the prior art.

A review of FIG. 2 indicates that with the interlayers of the present invention (see Curve G) the number of valleys approached zero at a distance of about 0.4 mil (10.2 microns) from the RMCL. When the valleys disappear the denominator NV becomes zero and the ratio goes to infinity.

The commercial interlayers represented by Curves H, I and J still have valleys remaining at distances greater than 0.4 mils (10.2 microns) beyond the roughness mean centerline. These deeper valleys are believed to give rise to printing defects when a gradient band is printed on the sheet as will be explained in greater detail below.

DESCRIPTION OF THE PREFERRED EMBODIMENTS

The plastic sheet material used in the present invention may be prepared from various thermoplastic synthetic polymers. Examples of such polymers include polyvinyl butyral, polyurethane, poly(ethylene-vinyl acetate), poly(ethylene-vinyl acetate-vinyl alcohol), poly(ethylene-methylmethacrylateacrylic acid), etc. The preferred materials are plasticized polyvinyl butyral and polyurethane with polyvinyl butyral being especially preferred. These materials are well known to those skilled in the art. The preferred interlayers of the present invention have a thickness in the range of from 10 to 60 mils.

The preferred polyvinyl butyral materials have Staudinger molecular weights ranging from about 50,000 to 600,000 and preferably from 150,000 to 270,000 and may be considered to be made up on a weight basis, of from 5 to 30% hydroxyl groups, calculated as polyvinyl alcohol, 0 to 40% ester groups, calculated as polyvinyl ester, and the balance substantially butyral groups. The polyvinyl butyral resin will preferably contain, on a weight basis, from 9 to 25% hydroxyl groups, calculated as polyvinyl alcohol and from 0 to 3% acetate groups, calculated as polyvinyl acetate, the balance being substantially butyral groups.

The polyvinyl butyral resin used may be plasticized with from about 20 to 80 parts plasticizer per hundred parts of resin and more commonly between 25 and 45 parts for normal windshield use. This latter concentration is generally used with polyvinyl butyrals containing 17 to 25% vinyl alcohol by weight. In general, the plasticizers which are commonly employed are esters of a polybasic acid or a polyhydric alcohol. Particularly suitable plasticizers are triethylene glycol di-(2-ethyl butyrate), dihexyl adipate, dibutyl sebacate, and mixtures of phosphates and adipates such as are disclosed in U.S. Pat. No. 3,841,890. The resulting plasticized resin mixture is then generally extruded in the form of sheets which are then printed as described below.

The preferred polyurethane materials are those described in U.S. Pat. Nos. 3,620,905, 3,823,060, and Belgium Pat. No. 785,125, which are incorporated herein by reference.

The interlayers of the present invention are prepared by casting molten polymer onto a specially prepared surface of a roll which imparts the desired surface characteristics to the molten material cast onto the roll. In this regard it should be noted that about 70 to about 90% of the surface characteristics of the roll are transferred to the sheet material cast onto the roll when using conventional die roll extrusion techniques. When viewed in this light, the roll surface can be considered as a negative of the surface of the sheet.

The die rolls used to prepare the interlayers of the present invention are prepared by taking a metal roll, preferably a chilled iron roll, which is free of pits, holes, scratches or other defects and which has a surface roughness of 32 RMS or smoother. The rolls are then treated in a conventional manner by blasting the roll, while it is rotating on its axis, with conventional blasting grit such as aluminum oxide, silicone oxide, etc. The size of the grit used is usually in the range of from 10 to 60 mesh, preferably 12 to 24 mesh, as determined by a U.S. standard sieve. The base roll is blasted using air pressure in the range of from 50 to 250 psi (3.5 to 17.6 kgs./sq.cm.). A number of passes are made over the roll with the blasting grit until the desired saturated surface roughness is obtained. With a 20 rpm roll speed, the blast nozzle traverse rate is preferably 2.0 inches/minute (5.1 cm/minute). Usually, the number of passes will be in the range of from 6 to 12. The feed rate for the blasting grit is in the range of from 2 to 40 pounds (0.91 to 18.1 kg.), preferably 8 to 12 pounds (3.6 to 5.5 kg.) of grit per minute according to the improved process of the present invention.

The roll is then blasted with glass beads in order to reduce the size and amount of the prominent peaks on the surface of the roll. The glass beads used are the same size or slightly smaller than the abrasive grit used. Preferably, the glass beads are larger than the average base diameters of the prominent peaks to permit reducing prominent peaks without filling in the valleys in the roll. Most preferably, the size of the glass beads is in the order of from 4 to 8 times larger than the base diameters of the prominent peaks. The diameters of the bases of the peaks are determined using a Gould Surfanalyzer. Usually, one to two passes of glass beads are employed while rotating the roll as described above.

Alternately, instead of blasting the roll with glass beads, the prominent peaks on the roll may be lapped using conventional lapping materials and methods. The degree of lapping required will depend on the nature and number of the prominent peaks as well as on the lapping methods used.

The roll is then plated with chrome, nickel or some other suitable metal and the metal plated surface is then overblasted with fine grit, usually finer (or smaller) than 60 mesh, preferably 100 to 140 mesh. The surface of the finished roll is characterized by having peaks and valleys around a roughness mean centerline (RMCL) which corresponds generally to the valleys and peaks, respectively, found on sheets which are cast upon the roll. In this regard, it should be noted that about 70 to about 90% of the surface characteristics of the roll are transferred to the sheet material cast onto the roll when using conventional die roll extrusion techniques. When viewed in this light, the roll surface can be considered as a negative of the surface of the sheet.

As stated above, only the peaks on the surface of the sheets are functional in that they prevent blocking, support the glass or plastic member of the laminates during the lamination procedure and provide the air passages which facilitate de-airing during the fabrication of the laminate. The deep valleys found in the sheet are not functional. In fact, they are undesirable in that they give rise to printing defects in the rotogravure printing of the sheet.

The present invention is directed to the discovery that sheet surfaces prepared on die rolls which are blasted with glass beads after the conventional abrasive grit blasting and before chrome plating, have improved surfaces. Molten thermoplastic sheet material cast onto these die roll surfaces have fewer deep valleys while maintaining the peaks thereby providing better sheet surfaces for printing while maintaining the antiblocking and de-airing properties found in the sheets of the prior art.

In the following examples the base die roll used is a chilled iron roll which is free of pits, holes, scratches or other defects which has a surface roughness of 16 RMS or smoother. The base roll is then finished as described in the particular examples.

The resin used to prepare the sheets in the following examples is conventional polyvinyl butyral which is plasticized with about 44 parts, per hundred parts of resin, of triethylene glycol di-2-ethylhexyl butyrate. The butyral is further characterized as having less than 3% by weight of residual acetate groups and hydroxyl content in the range of from 17 to 23% by weight.

The roughness of the roll surface and the sheet surface is determined using a Gould Surfanalyzer Model 150 and a Gould Surfanalyzer Recorder Model 280.

EXAMPLE 1

Prior Art

This example is set forth to illustrate the practice of the prior art in preparing interlayers for laminated safety glass.

A conventional base die roll is surfaced by blasting it with No. 16 mesh aluminum oxide grit using an air pressure of about 100 psi gauge and a grit feed rate of about 10 lbs. (4.54 kg.) per minute in order to obtain a saturated surface on the roll. The aluminum oxide used is commercial grade No. 16 grit which contains a broad range of particle sizes. Eight blasting passes are made over the roll with the aluminum oxide grit. The blasted roll is then plated with chromium to a thickness of about 0.002 inch (0.051 micron). The plated roll is then blasted with 120 mesh aluminum oxide grit in order to minimize the previously disclosed blocking tendencies of the interlayer. A tracing of the plated roll is made using a Gould Surfanalyzer and the roll is found to have a surface Roughness Height of $120 \times 10^{-5}$ inches (30.5 microns) as opposed to a surface Roughness Height of $128 \times 10^{-5}$ inches (32.5 microns) for the roll prior to chrome plating.

Molten plasticized polyvinyl butyral is extruded onto this die roll using a stock temperature of 385°–390° F. (196°–199° C.) and an extruded head pressure of 3500–4500 psi (246 to 316 kgs./sq.cm.) and formed into a conventional interlayer sheet material. The sheet is found to have a surface roughness characterized by an Arithmetic Average in the range of from $16.5 \times 10^{-5}$ to $21 \times 10^{-5}$ inches (4.2 to 5.3 microns) and a Roughness Height of from $66 \times 10^{-5}$ to $84 \times 10^{-5}$ inches (16.8 to 21.3 microns). The ratio of the number of peaks (NP) to the number of valleys (NV) is plotted at various distances from the roughness mean centerline (RMCL). The result of this plot is represented by Curve J in FIG. 2.

EXAMPLE 2

Prior Art

The die roll preparation method of Example 1 is repeated here except that the chilled iron roll is blasted with 14 mesh silicon carbide. The chrome plated roll has a Roughness Height of $127 \times 10^{-5}$ inches (31.6 microns) as determined by the Gould Surfanalyzer. The sheet formed on this roll, using an extruder stock temperature in the range of 400° to 420° F. (204° to 216° C), is characterized as having an Arithmetic Average surface roughness in the range of from $18.5 \times 10^{-5}$ to $24.3 \times 10^{-5}$ inches (4.7 to 6.2 microns) and a Roughness Height of from $74 \times 10^{-5}$ to $97 \times 10^{-5}$ inches (18.8 to 24.6 microns). The plot of the ratio of the number of peaks (NP) to the number of valleys (NV) at various distances from the roughness mean centerline is represented by Curve I in FIG. 2.

A comparison of Curve I and Curve J in FIG. 2 shows that the sheet prepared in Example 2 above (Curve I) has fewer deep valleys than the sheet prepared in Example 1 (Curve J). However, both sheets, which are prepared according to the methods of the prior art, have a substantial number of valleys which extend more than 0.4 mil (10.2 microns) below the roughness mean centerline.

EXAMPLE 3

This example illustrates the sheet surface of a commercially available plasticized polyvinyl butyral interlayer (Butacite 106 from duPont) which is prepared by an extrusion method which does not involve the use of a die roll. The surface of the sheet was analyzed using a Gould Surfanalyzer and the procedure set forth above. The sheet is found to have an Arithmetic Average roughness of $16.3 \times 10^{-5}$ to $18 \times 10^{-5}$ inches (4.1 to 4.6 microns) and a Roughness Height of $65 \times 10^{-5}$ to $72 \times 10^{-5}$ inches (16.5 to 18.3 microns). The ratio of the number of peaks (NP) to the number of valleys (NV) was plotted at various distances from the roughness mean centerline (RMCL). The results of this plot are represented by Curve H in FIG. 2.

EXAMPLE 4

This example illustrates the preparation of the sheet surfaces of the present invention. Example 1 is repeated here except that 20 mesh aluminum oxide grit is used to blast the base die roll. Ten passes of blasting grit are made over the roll using an air pressure of 77 psi (5.4 kg./sq.cm.). The surface Roughness Height of the roll before chrome plating is measured and found to be $80 \times 10^{-5}$ inches (20.3 microns). The prominent peaks on the roll have an average base diameter of about 6 mils (152 microns). The roll is then blasted with two passes of glass beads having a mesh size in the range of from 20 to 30 (36 mils or 929 microns in diameter) using an air pressure of 110 psi (7.7 kg./sq.cm.). The surface Roughness Height of the roll before chrome plating is found to be $58.1 \times 10^{-4}$ inches (14.8 microns). The plasticized polyvinyl butyral sheet material made using this roll is found to have an Arithmetic Average surface roughness in the range of from $13 \times 10^{-5}$ to $16 \times 10^{-5}$ inches (3.3 to 4.1 micron) and a Roughness Height of from $52 \times 10^{-5}$ to $64 \times 10^{-5}$ inches (13.2 to 16.3 microns). The plot of the ratio of the number of valleys (NV) at various distances from the roughness mean centerline is represented by Curve G in FIG. 2.

A review of Curves G, H, I and J in FIG. 2 readily illustrate that the sheet of the present invention (Curve G) has fewer deep valleys at a distance of 0.4 mil (10.2 microns) or less from the centerline than do those sheets from the prior art. The glass bead blasting used on the die roll used to prepare the sheet represented by Curve G is believed to remove the peaks on the roll which form the valleys in sheet material cast onto the roll.

As stated above, rough sheet surfaces give rise to printing defects on freshly printed sheet. One of the defects found in the gradient bands of freshly printed sheets is that which is referred to as mottle, which is defined as a random non-uniformity in color density. The degree of mottle is determined by laminating a freshly printed sheet between two pieces of glass and then examining the gradient band of the laminate using a uniform light source as a background for the laminate. A trained observer then assigns a mottle rating of from 0 to 10 to the gradient band, with the lower mottle ratings indicating fewer printing defects. Higher mottle ratings above 3 indicate that some amount of seasoning may be required in order to obtain the desired degree of uniformity in the gradient band.

In the preferred printing method, the ink is printed onto the interlayer using rotogravure type printing methods wherein a printing cylinder is engraved so as to form a cell pattern on the surface of the roll. The ink is picked up in the cells and then printed onto the sheet in the form of dots. The printing cylinders for automobile windshield sheet material are usually designed to give a color gradient. In the gradient printing process the ink is printed in a pattern such that there is a dark section at the top of the sheet which gradually and uniformly fades off into the clear section in the resulting laminated windshield. In this situation the darkest portion of the color gradient has an optical density in the range of from 1.70 to 0.70 which corresponds to a percent light transmission of from 2 to 20%, respectively.

EXAMPLES 5 TO 8

The following Examples 5 to 8 illustrate the improved printing results that are obtained when printing on the sheet surfaces of the present invention. The ink in these examples is described below:

INK COMPOSITION

|  | Parts by Weight | Percent |
| --- | --- | --- |
| N-methyl pyrrolidone | 461.32 | 75.8 |
| polyvinyl butyral | 19.48 | 3.2 |
| antioxidant | 25.56 | 4.2 |
| Amaplast Yellow CHS | 26.47 | 4.35 |
| Plasto Yellow MGS | 23.74 | 3.9 |
| Amaplast Blue OAP | 25.56 | 4.2 |
| Plasto Violet MR | 26.47 | 4.35 |
| Total | 608.60 | 100.00 |

The ink, which has a dye concentration of 16.8% by weight and a Brookfield viscosity of 140 centipoises at 27° C., is printed onto the sheets of Examples 1 to 4 above, using a rotogravure cylinder having 127 micron (5 mil) cell spacings. A conventional gradient band printing process is used employing a wide variety of operating conditions such as line speed, temperature, pressures, etc. The printed gradients are then examined for mottle and the results are tabulated in Table I below.

TABLE I

RATINGS OF LAMINATED FRESHLY PRINTED SHEET

| Example | Sheet Example | Surface Figure 2 | Mottle Rating |
| --- | --- | --- | --- |
| 5 | 1 | J | 3− |
| 6 | 2 | I | 3+ |
| 7 | 3 | H | 2 |
| 8 | 4 | G | 1 |

The data in Table I above illustrate that the interlayer surfaces of the present invention are more printable and have fewer printing defects than the interlayers prepared according to the prior art.

In other tests interlayers of the present invention are laminated between two sheets of glass to form conventional laminates of the type used as windshields in automobiles. These interlayers (see Curve G in FIG. 2) are comparable to those interlayers of the prior art (see Curves I and J in FIG. II) in regard to the general handling and performance characteristics involved in shaping, laying up and making the laminate. Little or no difference could be detected between these interlayers and those of the prior art in regard to the blocking or de-airing properties of the interlayer.

It will be apparent from reading the above specification that many changes and deviations can be made without departing from the spirit and scope of the present invention.

What is claimed is:

1. An interlayer for laminated safety glass wherein at least one surface of the interlayer is characterized by having:
   A. an Arithmetic Average roughness in the range of from 12 to 18 × 10$^{-5}$ inches as calculated around a roughness mean centerline drawn through the peaks and valleys on the surface of the interlayer;
   B. a Roughness Height in the range of from 48 × 10$^{-5}$ to 72 × 10$^{-5}$ inches; wherein at a distance of 0.4 mil or less from the mean centerline going in the direction to the center of the interlayer there are substantially no valleys on the surface of the interlayer.

2. An interlayer as in claim 1 wherein the characterized surface is printed with a gradient color band.

3. An interlayer as in claim 2 wherein the interlayer is prepared from plasticized polyvinyl butyral wherein the polyvinyl butyral contains from 5 to 30 percent by weight of hydroxyl groups, calculated as polyvinyl alcohol and 0 to 40 percent by weight of ester groups calculated as polyvinyl ester.

4. An interlayer as in claim 1 wherein the interlayer is prepared from polyurethane.

5. An interlayer as in claim 2 wherein the interlayer has a thickness in the range of from 10 to 60 mils.

6. A plasticized polyvinyl butyral interlayer for laminated safety glass wherein the polyvinyl butyral contains from 9 to 25 percent by weight of hydroxyl groups calculated as polyvinyl alcohol and 0 to 3 percent by weight of acetate groups calculated as polyvinyl acetate wherein at least one surface of the interlayer is characterized by having:
   A. an Arithmetic Average roughness in the range of from 12 to 18 × 10$^{-5}$ inches as calculated around a roughness mean centerline drawn through the peaks and valleys on the surface of the interlayer;
   B. a Roughness Height in the range of from 48 × 10$^{-5}$ to 72 × 10$^{-5}$ inches;

wherein at a distance of 0.4 mil or less from the mean centerline going in the direction to the center of the interlayer there are substantially no valleys on the surface of the interlayer.

7. An interlayer as in claim 6 wherein the characterized surface is printed with a gradient color band.

8. An interlayer as in claim 6 wherein the interlayer has a thickness in the range of from 10 to 60 mils.

9. A plasticized polyvinyl butyral interlayer for laminated safety glass wherein the polyvinyl butyral contains from 9 to 25 percent by weight of hydroxyl groups calculated as polyvinyl alcohol and 0 to 3 percent by weight of acetate groups calculated as polyvinyl acetate having a gradient band printed thereon wherein the printed surface of the interlayer is characterized by having:
   A. an Arithmetic Average roughness in the range of from 12 to 18 × 10$^{-5}$ inches as calculated around a roughness mean centerline drawn through the peaks and valleys on the surface of the interlayer;
   B. a Roughness Height in the range of from 48 × 10$^{-5}$ to 72 × 10$^{-5}$ inches;

wherein at a distance of 0.4 mil or less from the mean centerline going in the direction to the center of the interlayer there are substantially no valleys on the surface of the interlayer.

* * * * *